US010035358B2

(12) United States Patent

Pervan et al.

(10) Patent No.: US 10,035,358 B2
(45) Date of Patent: Jul. 31, 2018

(54) PANELS WITH DIGITAL EMBOSSED IN REGISTER SURFACE

(71) Applicant: CERALOC INNOVATION AB, Viken (SE)

(72) Inventors: Darko Pervan, Viken (SE); Tony Pervan, Stockholm (SE)

(73) Assignee: CERALOC INNOVATION AB, Viken (SE)

( * ) Notice: Subject to any disclaimer, the term of this patent is extended or adjusted under 35 U.S.C. 154(b) by 257 days.

(21) Appl. No.: 13/940,891

(22) Filed: Jul. 12, 2013

(65) Prior Publication Data

US 2014/0023832 A1 Jan. 23, 2014

Related U.S. Application Data

(60) Provisional application No. 61/672,573, filed on Jul. 17, 2012.

(51) Int. Cl.

| | |
|---|---|
| ***E04F 15/02*** | (2006.01) |
| ***B32B 3/26*** | (2006.01) |
| ***B32B 3/30*** | (2006.01) |
| ***B41J 3/407*** | (2006.01) |
| ***B41M 1/24*** | (2006.01) |
| ***B41M 5/025*** | (2006.01) |
| ***B41M 5/035*** | (2006.01) |
| ***E04F 15/06*** | (2006.01) |
| ***E04F 15/10*** | (2006.01) |

(52) U.S. Cl.

CPC ................ *B41J 3/407* (2013.01); *B41M 1/24* (2013.01); *B41M 5/0256* (2013.01); *B41M 5/0353* (2013.01); *E04F 15/02161* (2013.01); *E04F 15/06* (2013.01); *E04F 15/10* (2013.01); *E04F 15/02* (2013.01); *Y10T 428/2462* (2015.01)

(58) Field of Classification Search

CPC .... B32B 21/04; B32B 21/14; E04F 15/02161; E04F 15/02; Y10T 428/2462; B32B 3/26; B32B 3/30

USPC ........... 428/53, 58, 106, 141, 151, 172, 173, 428/195.1

See application file for complete search history.

(56) References Cited

U.S. PATENT DOCUMENTS

| | | | |
|---|---|---|---|
| 3,083,116 | A | 3/1963 | Berndt |
| 3,397,496 | A | 8/1968 | Sohns |
| 3,440,076 | A | 4/1969 | Vaurio |

(Continued)

FOREIGN PATENT DOCUMENTS

| | | | |
|---|---|---|---|
| DE | 10 2007 015 907 | A1 | 10/2008 |
| DE | 10 2010 036 454 | A1 | 1/2012 |

(Continued)

OTHER PUBLICATIONS

U.S. Appl. No. 61/751,418, Pervan et al.

(Continued)

*Primary Examiner* — Joanna Pleszczynska

(74) *Attorney, Agent, or Firm* — Buchanan Ingersoll & Rooney P.C.

(57) ABSTRACT

Building panels, especially floor panels, and a method of forming embossed in register surfaces with a digital ink head that applies a curable ink on the panel surface or on an upper side of a foil as a coating and forms an ink matrix that is used to create a cavity in the surface by applying a pressure on the ink matrix.

12 Claims, 5 Drawing Sheets

(56) References Cited

U.S. PATENT DOCUMENTS

| | | | | |
|---|---|---|---|---|
| 3,446,184 | A | 5/1969 | Johnson | |
| 3,545,997 | A | 12/1970 | Hochberg | |
| 3,634,975 | A | 1/1972 | Hensley | |
| 3,648,358 | A | 3/1972 | Cannady et al. | |
| 3,880,687 | A | 4/1975 | Elmendorf et al. | |
| 4,227,200 | A | 10/1980 | Mansukhani | |
| 4,312,268 | A | 1/1982 | King et al. | |
| 4,504,523 | A | 3/1985 | Miller et al. | |
| 4,689,259 | A | 8/1987 | Miller et al. | |
| 4,796,402 | A | 1/1989 | Pajala | |
| 4,833,530 | A | 5/1989 | Kohashi | |
| 4,880,689 | A | 11/1989 | Park et al. | |
| 4,943,816 | A | 7/1990 | Sporer | |
| 5,204,055 | A | 4/1993 | Sachs | |
| 5,380,392 | A | 1/1995 | Imamura et al. | |
| 5,498,466 | A | 3/1996 | Navarro | |
| 5,594,484 | A | 1/1997 | Furukawa | |
| 5,627,578 | A | 5/1997 | Weintraub | |
| 5,718,753 | A | 2/1998 | Suzuki et al. | |
| 5,778,789 | A | 7/1998 | Krishnan et al. | |
| 6,387,457 | B1 | 5/2002 | Jiang et al. | |
| 6,394,595 | B1 | 5/2002 | Jiang et al. | |
| 6,402,317 | B2 | 6/2002 | Yanagawa et al. | |
| 6,422,696 | B1 | 7/2002 | Takahashi et al. | |
| 6,439,713 | B1 | 8/2002 | Noguchi et al. | |
| 6,579,616 | B1 | 6/2003 | Beckman | |
| 6,773,799 | B1 | 8/2004 | Persson et al. | |
| 7,383,768 | B2 | 6/2008 | Reichwein et al. | |
| 7,632,561 | B2 * | 12/2009 | Thiers | 428/151 |
| 7,908,815 | B2 | 3/2011 | Pervan | |
| 8,114,513 | B2 | 2/2012 | Rentschler | |
| 8,337,947 | B2 | 12/2012 | Camorani | |
| 8,353,140 | B2 | 1/2013 | Pervan | |
| 8,371,456 | B2 | 2/2013 | Scadden | |
| 8,464,489 | B2 | 6/2013 | Pervan | |
| 8,544,230 | B2 | 10/2013 | Pervan | |
| 9,079,212 | B2 | 7/2015 | Pervan et al. | |
| 9,279,058 | B2 | 3/2016 | Pervan et al. | |
| 9,321,925 | B2 | 4/2016 | Pervan et al. | |
| 9,371,456 | B2 | 6/2016 | Pervan et al. | |
| 9,446,602 | B2 | 9/2016 | Pervan | |
| 9,528,011 | B2 | 12/2016 | Pervan et al. | |
| 9,630,404 | B2 | 4/2017 | Pervan et al. | |
| 9,670,371 | B2 | 6/2017 | Pervan et al. | |
| 2001/0005542 | A1 | 6/2001 | Graab et al. | |
| 2001/0022607 | A1 | 9/2001 | Takahashi et al. | |
| 2002/0149137 | A1 | 10/2002 | Jang et al. | |
| 2003/0108718 | A1 | 6/2003 | Simon et al. | |
| 2003/0138618 | A1 * | 7/2003 | Courtoy | B29C 59/046 428/308.4 |
| 2004/0101619 | A1 | 5/2004 | Camorani | |
| 2004/0142107 | A1 | 7/2004 | Eriksson et al. | |
| 2004/0153204 | A1 | 8/2004 | Blanco | |
| 2004/0177788 | A1 | 9/2004 | Rick et al. | |
| 2004/0180181 | A1 | 9/2004 | Franzoi et al. | |
| 2004/0180980 | A1 | 9/2004 | Petter et al. | |
| 2004/0217186 | A1 | 11/2004 | Sachs | |
| 2005/0128274 | A1 | 6/2005 | Matsushima | |
| 2005/0176321 | A1 | 8/2005 | Crette et al. | |
| 2005/0249923 | A1 | 11/2005 | Reichwein et al. | |
| 2006/0144004 | A1 * | 7/2006 | Nollet | B44C 1/24 52/578 |
| 2006/0188670 | A1 | 8/2006 | Kojima | |
| 2006/0246266 | A1 | 11/2006 | Hall | |
| 2007/0049047 | A1 | 3/2007 | Fujimoto | |
| 2007/0091160 | A1 | 4/2007 | Kis | |
| 2007/0107344 | A1 | 5/2007 | Kornfalt | |
| 2007/0193174 | A1 | 8/2007 | Vogel et al. | |
| 2007/0224438 | A1 | 9/2007 | Van Benthem et al. | |
| 2007/0240585 | A1 | 10/2007 | Vaish et al. | |
| 2007/0283648 | A1 | 12/2007 | Chen | |
| 2007/0299196 | A1 | 12/2007 | Ohkoshi et al. | |
| 2008/0010924 | A1 | 1/2008 | Pietruczynik et al. | |
| 2008/0185092 | A1 | 8/2008 | Blenkhorn | |
| 2008/0241472 | A1 | 10/2008 | Shiao et al. | |
| 2008/0261003 | A1 | 10/2008 | Lewis et al. | |
| 2009/0010682 | A1 | 1/2009 | Camorani | |
| 2009/0031662 | A1 | 2/2009 | Chen et al. | |
| 2009/0047480 | A1 | 2/2009 | Juers et al. | |
| 2009/0116966 | A1 | 5/2009 | Althoff et al. | |
| 2009/0151866 | A1 | 6/2009 | Endert | |
| 2009/0155612 | A1 | 6/2009 | Pervan et al. | |
| 2010/0134895 | A1 | 6/2010 | Hoffman et al. | |
| 2010/0166997 | A1 | 7/2010 | Chisaka et al. | |
| 2010/0192793 | A1 | 8/2010 | Verhaeghe | |
| 2010/0196678 | A1 | 8/2010 | Vermeulen | |
| 2010/0300020 | A1 * | 12/2010 | Vermeulen | 52/177 |
| 2010/0300030 | A1 | 12/2010 | Pervan et al. | |
| 2010/0307677 | A1 | 12/2010 | Buhlmann | |
| 2011/0024938 | A1 | 2/2011 | Tripp et al. | |
| 2011/0038826 | A1 | 2/2011 | Kimball et al. | |
| 2011/0129640 | A1 | 6/2011 | Beall | |
| 2011/0171412 | A1 | 7/2011 | Döhring | |
| 2011/0189448 | A1 | 8/2011 | Lindgren et al. | |
| 2011/0189471 | A1 | 8/2011 | Ziegler et al. | |
| 2011/0237739 | A1 | 9/2011 | Tada | |
| 2011/0247748 | A1 | 10/2011 | Pervan et al. | |
| 2011/0250404 | A1 | 10/2011 | Pervan et al. | |
| 2011/0261464 | A1 | 10/2011 | Hoffman et al. | |
| 2011/0268937 | A1 | 11/2011 | Schacht et al. | |
| 2011/0293906 | A1 | 12/2011 | Jacobsson | |
| 2012/0176443 | A1 | 7/2012 | Robertson et al. | |
| 2012/0196081 | A1 | 8/2012 | Gleich | |
| 2012/0263878 | A1 | 10/2012 | Ziegler et al. | |
| 2012/0264853 | A1 | 10/2012 | Ziegler et al. | |
| 2012/0269983 | A1 | 10/2012 | Grinberg et al. | |
| 2013/0043211 | A1 | 2/2013 | Vermeulen | |
| 2013/0108873 | A1 | 5/2013 | Shiao et al. | |
| 2014/0017452 | A1 | 1/2014 | Pervan et al. | |
| 2014/0028772 | A1 | 1/2014 | Pervan | |
| 2014/0196618 | A1 | 7/2014 | Pervan et al. | |
| 2014/0198168 | A1 | 7/2014 | Pervan et al. | |
| 2014/0198170 | A1 | 7/2014 | Pervan et al. | |
| 2014/0199495 | A1 | 7/2014 | Pervan et al. | |
| 2014/0199513 | A1 | 7/2014 | Pervan et al. | |
| 2014/0199531 | A1 | 7/2014 | Pervan et al. | |
| 2014/0220318 | A1 | 8/2014 | Pervan | |
| 2015/0030817 | A1 | 1/2015 | Wiegelmann | |
| 2015/0274997 | A1 | 10/2015 | Pervan et al. | |
| 2015/0298492 | A1 | 10/2015 | Palumbo | |
| 2016/0144612 | A1 | 5/2016 | Pervan et al. | |
| 2016/0208116 | A1 | 7/2016 | Pervan et al. | |
| 2016/0250853 | A1 | 9/2016 | Pervan et al. | |
| 2016/0325559 | A1 | 11/2016 | Pervan et al. | |
| 2016/0368280 | A1 | 12/2016 | Pervan | |
| 2017/0066255 | A1 | 3/2017 | Pervan | |
| 2017/0204281 | A1 | 7/2017 | Pervan | |
| 2017/0232761 | A1 | 8/2017 | Pervan | |

FOREIGN PATENT DOCUMENTS

| | | | |
|---|---|---|---|
| EP | 0 403 264 | A2 | 12/1990 |
| EP | 0 657 309 | A1 | 6/1995 |
| EP | 0 769 535 | A2 | 4/1997 |
| EP | 0 769 535 | A3 | 9/1997 |
| EP | 1 020 303 | A1 | 7/2000 |
| EP | 1 020 765 | A1 | 7/2000 |
| EP | 1 209 199 | A1 | 5/2002 |
| EP | 1 460 108 | A1 | 9/2004 |
| EP | 1 584 378 | A1 | 10/2005 |
| EP | 1 961 556 | A1 | 8/2008 |
| EP | 2 106 903 | A1 | 10/2009 |
| EP | 2 108 524 | A1 | 10/2009 |
| EP | 2 213 476 | A1 | 8/2010 |
| EP | 2 363 299 | A1 | 9/2011 |
| EP | 1 460 108 | B1 | 10/2012 |
| GB | 1 215 551 | A | 12/1970 |
| GB | 1 344 197 | A | 1/1974 |
| GB | 2 065 556 | A | 7/1981 |
| GB | 2 128 898 | A | 5/1984 |
| GB | 2 419 110 | A | 4/2006 |
| GB | 2 452 545 | A | 3/2009 |
| JP | S51-128409 | A | 11/1976 |
| JP | 6-287467 | A | 10/1994 |

(56) References Cited

FOREIGN PATENT DOCUMENTS

| | | | |
|---|---|---|---|
| JP | 2001-311254 | A | 11/2001 |
| JP | 2005-097339 | A | 4/2005 |
| JP | 2008-156573 | A | 7/2008 |
| JP | 2008-265229 | A | 11/2008 |
| JP | 2009-173003 | A | 8/2009 |
| JP | 2010-209325 | A | 9/2010 |
| JP | 2001-311254 | A | 11/2011 |
| KR | 2009-0112326 | A | 10/2009 |
| WO | WO 01/72489 | A2 | 10/2001 |
| WO | WO 02/42373 | A1 | 5/2002 |
| WO | WO 03/057488 | A1 | 7/2003 |
| WO | WO 2005/097874 | A2 | 10/2005 |
| WO | WO 2005/120847 | A1 | 12/2005 |
| WO | WO 2006/057241 | A1 | 6/2006 |
| WO | WO 2006/125036 | A2 | 11/2006 |
| WO | WO 2007/033031 | A2 | 3/2007 |
| WO | WO 2007/060298 | A1 | 5/2007 |
| WO | WO 2007/096746 | A2 | 8/2007 |
| WO | WO 2007/109763 | A2 | 9/2007 |
| WO | WO 2007/109763 | A3 | 9/2007 |
| WO | WO 2007/125098 | A1 | 11/2007 |
| WO | WO 2008/042088 | A1 | 4/2008 |
| WO | WO 2008/121749 | A1 | 10/2008 |
| WO | WO 2009/030935 | A2 | 3/2009 |
| WO | WO 2009/065769 | A2 | 5/2009 |
| WO | WO 2009/065769 | A3 | 5/2009 |
| WO | WO 2009/080772 | A1 | 7/2009 |
| WO | WO 2010/070485 | A2 | 6/2010 |
| WO | WO 2011/064075 | A2 | 6/2011 |
| WO | WO 2011/077200 | A1 | 6/2011 |
| WO | WO 2011/107610 | A1 | 9/2011 |
| WO | WO 2011/129757 | A1 | 10/2011 |
| WO | WO 2012/007230 | A1 | 1/2012 |
| WO | WO 2012/141651 | A1 | 10/2012 |
| WO | WO 2014/014400 | A1 | 1/2014 |
| WO | WO 2014/017972 | A1 | 1/2014 |
| WO | WO 2014/037823 | A1 | 3/2014 |
| WO | WO 2014/109703 | A1 | 7/2014 |

OTHER PUBLICATIONS

U.S. Appl. No. 13/938,589, Pervan et al.
U.S. Appl. No. 13/940,572, Pervan.
Pervan, Darko, et al., U.S. Appl. No. 61/751,418, entitled "Digital Printing and Embossing," filed in the U.S. Patent and Trademark Office on Jan. 11, 2013.
Pervan, Darko, et al., U.S. Appl. No. 13/938,589, entitled "Digital Coating and Printing," filed in the U.S. Patent and Trademark Office on Jul. 10, 2013.
Pervan, Darko, U.S. Appl. No. 13/940,572, entitled "Digital Binder Printing," filed in the U.S. Patent and Trademark Office on Jul. 12, 2013.
U.S. Appl. No. 14/152,253, Pervan, et al.
U.S. Appl. No. 14/152,347, Pervan, et al.
U.S. Appl. No. 14/152,281, Pervan, et al.
U.S. Appl. No. 14/452,393, Pervan, et al.
U.S. Appl. No. 14/152,356, Pervan, et al.
U.S. Appl. No. 14/152,295, Pervan, et al.
U.S. Appl. No. 14/155,096, Pervan.
International Search Report issued in PCT/SE2013/050900, Nov. 15, 2013, Patent-och registreringsverket, Stockholm, SE, 6 pages.
Pervan, Darko, et al., Technical Disclosure entitled Digital Printing and Embossing, IP.com No. IPCOM000224950D, IP.com PriorArtDatabase, Jan. 15, 2013, 89 pages.
Odian, George, "Principles of Polymerization," 1991, 3rd Edition, 5 pages incl. pp. 122-123, John Wiley & Sons, Inc., New York, NY, USA.
Pervan, Darko, et al., U.S. Appl. No. 14/152,253, entitled "Digital Binder and Powder Print," filed in the U.S. Patent and Trademark Office on Jan. 10, 2014.
Pervan, Darko, et al., U.S. Appl. No. 14/152,347, entitled "Dry Ink for Digital Printing," filed in the U.S. Patent and Trademark Office on Jan. 10, 2014.
Pervan, Darko, et al., U.S. Appl. No. 14/152,281, entitled "Digital Embossing," filed in the U.S. Patent and Trademark Office on Jan. 10, 2014.
Pervan, Darko, et al., U.S. Appl. No. 14/152,393, entitled "Digital Printing with Transparent Blank Ink," filed in the U.S. Patent and Trademark Office on Jan. 10, 2014.
Pervan, Darko, et al., U.S. Appl. No. 14/152,356, entitled "Digital Thermal Binder and Powder Printing," filed in the U.S. Patent and Trademark Office on Jan. 10, 2014.
Pervan, Darko, et al., U.S. Appl. No. 14/152,295, entitled "Digital Printing and Embossing," filed in the U.S. Patent and Trademark Office on Jan. 10, 2014.
Pervan, Darko, U.S. Appl. No. 14/155,096, entitled "Digital Overlay," filed in the U.S. Patent and Trademark Office on Jan. 14, 2014.
Pervan, Darko, Technical Disclosure entitled "Digital Overlay," IP.com No. IPCOM000225271D, IP.com PriorArtDatabase, Feb. 5, 2013, 24 pages.
U.S. Appl. No. 15/013,310, Pervan, et al.
Per Van, Darko, et al., U.S. Appl. No. 15/013,310 entitled "Digital Embossing," filed in the U.S. Patent and Trademark Office on Feb. 2, 2016.
U.S. Appl. No. 14/739,307, Pervan, et al.
Pervan, Darko, et al., U.S. Appl. No. 14/739,307 entitled "Dry Ink for Digital Printing", filed in the U.S. Patent and Trademark Office on Jun. 15, 2015.
Hudd, "Chapter 1: Inkjet Printing Technologies," *Chemistry of inkjet Inks*, 2010; pp. 3-18, World Scientific Publishing Co. PTE. Ltd. , Published in Singapore and Hackensack, NJ.
Owens, James C., "A Tutorial on Printing", *Imaging.org—Resources*. 2010, pp. 1-5, Society for Imaging sciences and Technology, retrieved Jul. 27, 2015 from http://web.archive.org/web/20100706153535/http://www.imaging.org/ist/resources/tutorial.
"Digital," Definition by Merriam-Webster, 2015, pp. 1-5, Merriam-Webster, incorporated, retrieved Aug. 6, 2015 from http://www.merriam-webster.com/dictionary/digital.
Pervan, Darko, et al., U.S. Appl. No. 15/081,120 entitled "Dry Ink for Digital Printing," filed in the U.S. Patent and Trademark office dated Mar. 25, 2016.
Pervan, Darko, et al., U.S. Appl. No. 15/150,571 entitled "Digital Thermal Binder and Powder Printing," filed in the U.S. Patent and Trademark Office dated May 10, 2016.
U.S. Appl. No. 15/216,081, Darko Pervan, filing date Jul. 21, 2016.
U.S. Appl. No. 15/251,330, Darko Pervan, filing date Aug. 30, 2016.
U.S. Appl. No. 15/354,338, Darko Pervan, filing date Nov. 17, 2016.
Extended European Search Report dated May 3, 2016 in EP 13 82 0175.1, European Patent Office, Munich, DE, 8 pages.
Romano, Frank J., Digital Printing Pocket Primer Series "Mastering On-Demand and Variable Data Printing for Profit," Copyright 2000, 52 pages, Windsor Professional Information, L.L.C., San Diego, CA.
Sandpaper Definition, Wikipedia, the free encyclopedia, retrieved from the Internet: https://en.wikipedia.org/wiki/Sandpaper, Jan. 24, 2017, 8 pages.
Pervan, Darko, et al., U.S. Appl. No. 15/478 581 entitled "Dry Ink for Digital Printing," filed in the U.S. Patent and Trademark Office dated Apr. 4, 2017.
Pervan, Darko, et al., U.S. Appl. No. 15/585,482 entitled "Digital Thermal Binder and Powder Printing," filed in the U.S. Patent and Trademark Office dated May 3, 2017.
Pervan, Darko, et al., U.S. Appl. No. 15/840,056 entitled "Digital Thermal Binder and Powder Printing," filed in the U.S. Patent and Trademark Office dated Dec. 13, 2017.
Pervan, Darko, et al., U.S. Appl. No. 15/845,828 entitled "Dry Ink for Digital Printing", filed in the U.S. Patent and Trademark Office dated Dec. 18, 2017.
Pervan, Darko, U.S. Appl. No. 15/903,444 entitled "Digital Binder Printing," filed in the U.S. Patent and Trademark Office dated Feb. 23, 2018.

* cited by examiner

KNOWN TECHNOLOGY

KNOWN TECHNOLOGY

PANELS WITH DIGITAL EMBOSSED IN REGISTER SURFACE

CROSS REFERENCE TO RELATED APPLICATIONS

The present application claims the benefit of U.S. Provisional Application No. 61/672,573, filed on Jul. 17, 2012. The entire contents of U.S. Provisional Application No. 61/672,573 are hereby incorporated herein by reference in their entirety.

TECHNICAL FIELD

The disclosure generally relates to the field of panels with a decorative wear resistant surface, preferably floor and wall panels. The disclosure relates to building panels with such decorative surfaces and to production methods to produce such panels.

FIELD OF APPLICATION

Embodiments of the present invention are particularly suitable for use in floors, which may be formed of floor panels comprising a core, a decorative layer and a transparent wear resistant structured layer above the decorative layer. The following description of technique, problems of known systems and objects and features of embodiments of the invention will therefore, as a non-restrictive example, be aimed above all at this field of application and in particular at floorings which are similar to conventional laminated floorings or floorings with a resilient surface layer.

It should be emphasized that embodiments of the invention may be used to produce a surface layer in any type of panels, for example in building panels such as wall panels, ceilings, and furniture components and similar. The method may be used to form embossed structures in wood floors, vinyl based floors such as so-called LVT floors and ceramic tiles.

BACKGROUND

The majority of all laminate floors are produced according to a production method generally referred to as Direct Pressed Laminated (DPL). Such laminated floors comprise a core of a 6-12 mm fibre board, a 0.2 mm thick upper decorative surface layer of laminate and a 0.1-0.2 mm thick lower balancing layer of laminate, plastic, paper or like material.

The surface layer of a laminate floor is characterized in that the decorative and wear properties are generally obtained with two separate layers of paper, one above the other. The decorative layer is generally a printed paper and the wear layer is a transparent overlay paper, which comprises small aluminium oxide particles.

The printed decorative paper and the overlay are impregnated with melamine formaldehyde resins and laminated to a HDF core in large laminate presses where the resin cures under high heat (160-200 degrees Celsius) and pressure and the papers are laminated to the core material. An embossed press plate forms the surface structure. Sometimes a structured paper is used as a press matrix.

Laminated floors may also be produced with printing technology. One advantage is that the pressing operation may be avoided and that no printed papers are needed to provide a decorative wear resistance surface.

Floor panels with a Direct Printed Laminate surface comprise the same type of HDF core as DPL. The décor is printed directly onto the core. The production process is rather complicated and is only cost efficient in very large production volumes.

Hydro printing inks are used to print the décor by a multicolour printing press with rollers that print directly onto the pre-sealed core. The printed décor layer must be protected against wear. The most common method to achieve high abrasive strength is to use, anti-abrasive UV sealers, which are applied on the print by rollers and cured by UV light. Embossed structures may be formed by embossed rollers.

Direct printing technology may be replaced with Digital printing Technology that is much more flexible and small production volumes can be economically manufactured. The difference between these two methods is mainly the printing step where printing rollers are replaced by a digital non-contact printing process and where the desired image is directly applied on to the pre-finished core. The final transparent coating which protects the digital image and the structured surfaces are usually of the same type as used in direct printing. Any types or printed images may be created but the surface structure is always limited to the form of the embossed rollers or structured films that are pressed against the surface.

Digital printing may also be used to print on a paper sheet that is used in conventional laminate production. The print may be applied on a separate impregnated or non-impregnated paper that after printing is applied on a core. A raw paper may also be applied on a core comprising a resin that, during pressing, penetrates into the raw paper. The main advantage is that impregnation and very accurate positioning of the paper may be avoided.

Recently new "paper free" floor types have been developed with solid surfaces comprising a substantially homogenous powder mix of fibres, binders and wear resistant particles.

The powder mix may comprise aluminium oxide particles, melamine formaldehyde resins and wood fibres. In most applications decorative particles such as, for example colour pigments are included in the mix. In general all these materials are applied in dry form as a mixed powder on a HDF core and cured under heat and pressure to a 0.1-1.0 mm solid layer. Melamine formaldehyde resin and wood fibres may be replaced by thermoplastic particles.

Several advantages over known technology and especially over conventional laminate floorings may be obtained such as increased wear and impact resistance, deep embossing, increased production flexibility and lower costs.

Powder technology is very suitable to produce a decorative surface layer, which is a copy of stone and ceramics. It is however more difficult to create designs such as, for example wood decors. However, recently digital powder printing has been developed and it is possible to create very advanced designs of any type by injecting a digital print into the powder prior to pressing. The surface structure is made in the same way as for laminate flooring by a structured press plate or an embossed matrix paper that is pressed against the powder.

Floors with a surface of wood are produced in many different ways. Traditional solid wood floors have developed into engineered floors with wood layers applied on a core made of wood lamellas, HDF or plywood. The majority of such floors are delivered as pre-finished floors with a wood surface that is coated with several transparent layers in the factory. Recently wood floorings have also been produced with a digitally printed pattern that improves the design of the wood grain structure in wood species that do not have a sufficient surface quality.

The majority of all the above-described floors have an embossed surface structure, especially when the decorative printed décor is a wood pattern. The embossed structure was in the past provided as a separate general structure type that was used for many different décor types. Recently most floor producers have introduced the so-called Embossed In Register (EIR) method where the embossed surface structure is specifically formed for each type of wood species and the embossing is made in register with the printed décor. This provides advanced designs that are difficult to differentiate from the natural materials such as wood and stone. Embossed surfaces are an essential part of the surface structure and design and it would be an advantage if such structures may be formed in a more flexible and cost efficient way.

Definition of Some Terms

In the following text, the visible surface of the installed floor panel is called "front side", while the opposite side of the floor panel, facing the sub floor, is called "rear side". By "surface layer" are meant all layers which give the panel its decorative properties and its wear resistance and which are applied to the core closest to the front side covering preferably the entire front side of the floorboard.

By "print" is meant a décor, design, pattern or image. By "up" is meant towards the front side and by "down" towards the rear side. By "vertically" is meant perpendicular to the surface and by "horizontally" parallel to the surface.

By "pigments for digital print ink" is meant a material that changes the colour of reflected or transmitted light as the result of wavelength-selective absorption.

By "dye ink" is meant a coloured substance that has an affinity to the substrate to which it is being applied. The dye is generally applied in an aqueous solution, which also may contain a binder, and may require a mordant to improve the fastness of the dye on the fibre. In contrast to pigments that are small insoluble particles, a dye is completely soluble like sugar in water.

By "aqueous or water based ink" is meant an ink where water is used as liquid substance in the ink. The water-based liquid carries the pigments. A binder is present in the system as well to bind the pigments to the substrate.

By "solvent based ink" is meant ink that generally contains three major parts such as a fluid carrier, pigments and resins. Technically, solvent ink refers generally only to the oil-based carrier portion of the ink that keeps the other components in liquid form and once applied to a surface through jetting evaporates.

By "UV curable inks or coating" is meant ink or coating that after application is cured by exposure to strong UV-light in an UV oven.

By "matrix" is meant a material that forms an embossed surface structure when the material is pressed against a surface.

By "mat ink" is meant a curable ink or coating substance that when applied, cured and pressed against a substrate creates a depression in the substrate. By "ink matrix" is meant a press matrix formed by the mat ink substance that is cured to a hard structure such that it may create depressions in a surface during pressing. By "digital coating" is meant a digital application of a curable ink by a digital ink head.

By "Embossed In Register" or EIR means that a printed décor is in register with an embossed structure. By "Digital Variable Embossed In Register", DVEIR, means that the embossed in register is partly or completely created digitally and varies in register with the variation of the printed décor.

Known Technique and Problems Thereof

The general technology, which is used by the industry to provide a digital print, is described below. The methods described below may be used separately or in combinations to create a digital print or a digital application of a substance in the embodiments of this disclosure.

High definition digital printers use a non-impact printing processes. The printer has print heads that "fire" drops of ink from the print heads to the substrate in a very precise manner.

Multipass printing, also called scanning printing, is a printing method where the printer head moves transverse above the substrate many time to generate an image. Such printers are slow but one small print head can generate a bigger image.

Industrial printers are generally based on a Single Pass printing method, which uses fixed printer heads, with a width that corresponds to the width of the printed media. The printed substrate moves under the heads. Such printers have a high capacity and they are equipped with fixed print heads that are aligned one after each other in the feeding direction. Each head prints one colour. Such printers may be custom made for each application.

FIG. 1*a* shows a single pass printer 35 comprising five digital print heads 30*a-e*, which are connected with ink pipes 32 to ink containers 31 that are filled with ink of different colours. The ink heads are connected with digital data cables 33 or wireless to a digital control unit 34 that controls the application of the ink drops and the speed of the conveyor 21 that displaces the panel under the print heads with high precision in order to guarantee a high quality image comprising several colours.

A normal width of an industrial print head is about 6 cm and any lengths may be printed. Wide areas of 1-2 m may be printed with digital printers comprising several rows of print heads aligned side by side.

Number of dots per inch or DPI is used to define the resolution and the printing quality of a digital printer. 300 DPI is generally sufficient to, for example print wood grains structures of the same quality presently used in conventional laminate floorings. Industrial printers can print patterns with a resolution of 300-1000 DPI and even more and with a speed exceeding 60 m/min.

The print may be a "full print." This means that the visible printed décor is mainly created by the ink pixels applied into the powder or surface layer. The colour of a powder layer or a base colour has in such an embodiment in general a limited effect on the visible pattern or décor.

The print may also be a "part print". The colour of another underlying layer is one of the colours that are visual in the final décor. The area covered by printed pixels and the amount of ink that is used may be reduced and cost savings may be obtained due to lower use of ink and increased printing capacity compared to a full print design.

The print may be based on the CMYK colour principle. This is a 4-colour setup comprising cyan, magenta, yellow and black. Mixing these together will give a colour space/gamut, which is relatively small. To increase specific colour or the total gamut spot colours may be added. A spot colour may be any colour. The colours are mixed and controlled by a combination of software and hardware (print engine/print heads).

New technology has been developed by Välinge Innovation AB that makes it possible to inject a digital print into a powder layer. This new type of "Digital Injection Print" or DIP is obtained due to the fact that printing is made into a powder that is cured after printing. The print is embedded into the cured layer and is not applied on a layer as when conventional printing methods are used.

The print may be positioned in several dimensions horizontally and vertically in different depths. This may be used to create 3D effects when transparent fibres are used and to increase the wear resistance. No protective layers are needed that disturb the original design.

The DIP method may be used in all powder based materials, which may be cured after printing. However, the DIP method is especially suitable to be used when the powder comprises a mix of wood fibres, small hard wear resistant particles and a melamine formaldehyde resin. The surface layer may also comprise thermoplastic material, for example, vinyl particles, which are applied in powder form on a substrate. This allows that the print may be injected in the vinyl powder particles. An improved design and increased wear resistance may be reached even in such materials.

A suitable printer head has to be used in order to obtain a high printing quality and speed in powder based layers and other layers as described above. A printer head has several small nozzles that can shoot droplets of inks in a controlled way (Drop On Demand—DOD). The size of each droplet may vary, dependant on ink type and head type, between normally 1-100 picoliters. It is possible to design print heads that may fire bigger drops up to 200 picoliters more. Some printer heads can shoot different droplet sizes and they are able to print a greyscale. Other heads can only shoot one fixed droplet size.

Different technologies may be used to shoot the drops out of the nozzle.

Thermal printer head technology use print cartridges with a series of tiny chambers each containing a heater, all of which are constructed by photolithography. To eject a droplet from each chamber, a pulse of current is passed through the heating element causing a rapid vaporisation of the ink in the chamber to form a bubble, which causes a large pressure increase, propelling a droplet of ink out through the nozzle to the substrate. Most consumer inkjet printers, from companies including Canon, Hewlett-Packard, and Lexmark use thermal printer heads.

Most commercial and industrial inkjet printer heads and some consumer printers such as those produced by Epson, use the Piezoelectric/piezoelectric printer head technology. A piezoelectric material in an ink-filled chamber behind each nozzle is used instead of a heating element. When a voltage is applied, the piezoelectric material changes shape, which generates a pressure pulse in the fluid forcing a droplet of ink from the nozzle. Piezoelectric (also called Piezo) inkjet allows a wider variety of inks than thermal inkjet, as there is no requirement for a volatile component, and no issue with kogation. A lot of ink types may be used such as dye inks, solvent based inks, latex inks or UV curable inks.

Inks are generally individually mixed together by using colour pigments and several chemicals. Water based inks comprising colour pigments are especially suitable and may provide a cost efficient printing method with high quality in many different materials.

The above description of various known aspects is the applicants' characterization of such, and is not an admission that any of the above description is prior art. Several of the technologies described above are known and used individually but not in all combinations and ways as described above.

FIGS. 1*b*-1*c* shows forming of an embossed surface. A wood grain structure WG is provided as a print P on a surface 2 as shown in FIG. 1*b*. The surface is pressed against a matrix, generally an embossed steel plate, and embossed portions 17 that forms a basic embossing are formed as cavities or protrusions in the surface 2 as shown in FIG. 1*c*. FIG. 1*d* shows forming of an EIR surface. The embossed portions 17 and the print P are formed in register and the embossed portions 17 are positioned above the printed portions P.

FIGS. 2*a-c* shows forming of an EIR surface in a laminate floor. A matrix 40, which generally is a steel plate or a combination of a steel plate and an embossed paper layer, is pressed by a press table 24 against the printed surface 2 and an EIR surface 16 is formed after pressing as shown in FIG. 2*c*.

EIR provides a very advanced design, which is difficult to differentiate from real wood. However the technology is expensive and complicated since decorative papers or prints on a board must be in an accurate position in relation to embossed steel plates paper matrix or rollers that are used to create the embossed structure.

One of the major disadvantages with the known technology is that repetition effect cannot be avoided. Most laminate floors are produced in large sheets with a format of 2.1*2.7 m and this gives about 10 panels or a floor area of 5 m2 when the floor panels have been formed by cutting and milling a locking system as shown in FIG. 2*d*. The printing cylinders have generally a perimeter of 1.3 m and this means that the sheet consist of two identical sheet parts S1 and S2.

There are no limitations related to the size of the décor if digital printing is used. However the repetition effects of the structured matrix cannot be avoided. FIG. 2*e* shows that digital printing allows that 10 individual panels may be produced without repetition but there will always be some floor panels in a floor, which have an identical surface structure. Some producers use a double press and it is possible to use two press plates. This is an expensive and complicated production method and the floor area is still limited to about 10 m2 that may be maximally installed without repetition effect due to the structured surface.

To summarize, it may be mentioned that digital printing is a very flexible method but it cannot be fully utilized in connection with EIR surfaces since the printed décor must always be adapted to the embossed press plate, roller or film. A common feature for all such floors as described above is that all surfaces have the same basic structure and are not possible to adjust and adapt to any changes in the décor. This repetition effects provide a floor surface that is not similar to a wood floor where all practically panels have different designs and structures due to the wood grain structure of the wood. Copies of stone and other natural materials cannot be produced in a way that is a true copy of the natural material where design and structure generally is perfectly combined and all panels are different.

Even when conventional printed decors produced by printing cylinders are used, structured surfaces are expensive since the cost for the embossed steel plates/rollers are high and the plates are exposed to considerable wear when they are pressed with high pressure towards a surface that comprises wear resistant particles. It would be a major advantage if embossed surfaces and especially EIR surfaces may be produced in a way that is more cost efficient and that allows a change of the embossed structure in the same was as digital printing allows a change of the décor.

The digital application technology is mainly only used to obtain advantages related to the possibility to create a high-resolution image in a flexible way. However, the other aspects of the technology, mainly related to the possibility to apply a substance very precisely with a non-impact method, have not been fully utilized or developed, especially not in combination with substances that are not intended to create an image.

EP 2 108 524 describes a method in which protrusions are formed on a substrate with two or more digital prints provided on top of each other.

US 2013/0043211 describes a method, which comprises printing a curable substance or surface removing substance onto a panel in pre-defined pattern for creation an elevation on the panel at the pattern or removing a portion of the surface of the panel. The print may be a digital print and the surface removing substance may be a liquid combined with a powder. The substance is selected such that it reacts with the surface of the panel so as to remove a portion thereof.

The described methods are not suitable to be used in laminate and powder based floors that comprise thermosetting resins cured by heat and pressure. They are not suitable to create embossed structures in other surfaces such as wood and vinyl surface that are formed by pressing an upper protective surface layer.

EP 2 213 476 describes a method whereby a predetermined pattern may be printed on a carrier with curable liquid so as to form an embossing. The main disadvantages with this method is that the curable liquid is applied on the lower side of the carrier that during pressing is in contact with the substrate. The curable liquid must be bonded firmly to the carrier in order to be removed when the carrier is removed. This is a complicated operation since a carrier generally comprises a release agent and the liquid is very difficult to bond to the carrier in a fixed manner. It is not possible to use the same carrier for different embossed patterns.

It would be a major advantage if embossed structures may be formed in a flexible way, preferably digitally, with pressure applied on the surface.

Objects and Summary

The objective of certain embodiments of the invention is to provide a building panel, preferably a floor panel, and a method to produce such building panels with an embossed surface, which may be produced in a more flexible and cost efficient way and adapted during production to a printed décor that may be a digital print.

The above objectives are exemplary, and the embodiments of the invention may accomplish different or additional embodiments.

An embodiment of the invention is based on a main principle where a variable embossing is formed by digitally applied curable ink, also referred to as a mat ink, that after digital application and curing forms a matrix, hereafter referred to as an ink matrix, that is pressed against a substrate and that after curing of the substrate and removal of the ink matrix from the substrate forms an embossed structure on the substrate. This allows that a flexible embossing may be formed by a pressing step and such embossing may be coordinated with a flexible digital print where individual panels may have different decors and structures without repetition effects.

A first aspect of the invention is a method of forming an embossed surface in a building panel. The method comprises the steps of:

- forming an ink matrix having a horizontal and vertical extension by applying a curable ink by means of a digital ink head;
- positioning the ink matrix on a surface layer of a building panel,
- forming a cavity in the surface layer by pressing the ink matrix against the surface layer, thereby forming an embossed surface of the building panel, and
- removing the ink matrix from the embossed surface.

According to an embodiment of the first aspect of the invention, a method of forming an embossed surface in a building panel is provided. The method comprises the steps of:

- forming an ink matrix having a horizontal and vertical extension by applying a curable ink on a surface layer of the building panel by means of a digital ink head,
- forming a cavity in the surface layer by pressing the ink matrix against the surface layer, thereby forming an embossed surface of the building panel, and
- removing the ink matrix from the embossed surface.

The building panel may be a floor panel.

The surface layer may comprise a decorative layer with a print, preferably a digital print.

The cavity may be formed in register with the print.

The digital ink head may be a Piezo head.

The curable ink may be a polymer material, preferably a UV curing polymer material.

The method may further comprise the step of curing the ink matrix.

The ink matrix may be formed on the surface layer of the building panel.

The ink matrix may be formed on a substrate, preferably a basic matrix that is pressed against the panel surface.

The method may be used to form embossed structures on a panel that comprises a basic embossing formed by conventional production methods and a complementary digitally formed embossing specially adapted to individual panels.

A second aspect of the invention is a set of building panels having a surface layer comprising a decorative layer and an embossed upper layer. The decorative layer comprises a variable print and the embossed upper layer comprises a basic embossing being essential identical for the set of building panels and a variable embossing being distinguishing for each building panel. The variable embossing is in register with the variable print.

The variable embossing may be unique or individual for each building panel.

The building panels may be floor panels.

The variable print may be a digital print.

The basic embossing may be formed in register with a basic design of the decorative layer.

The basic design of the decorative layer may be a print, preferably a digital print.

The building panels may be configured with an embossed surface that allows a floor area of more than about 10 m2, preferably more than about 15 m2, to be installed where all building panels have different surface structures. For example, more than 20 different building panels, each with a different surface structure, may be produced.

The basic principles may also be used to apply an embossed structure on an upper side of a foil that during pressing is in contact with a press table. The embossed structure is pressed into the foil during pressing and the foil is automatically formed as a press matrix that creates depressions in a panel surface where digitally applied curable ink, or mat ink, forms an ink matrix. The advantage is that the foil is easy to remove from the pressed surface and that the surface structure of the foil may be used to form a part of the basic embossing even on surface portions, which are formed by the ink matrix.

A third aspect of the invention is a method of forming a matrix for forming an embossed surface on a building panel, comprising the steps:

- providing a matrix comprising a foil with a lower part comprising a release surface that during pressing is in contact with a surface of the building panel and that prevents the matrix from bonding to the surface of a building panel, preferably a thermosetting or thermoplastic surface of a building panel, and
- applying a curable ink by means of a digital ink head on an upper part of the foil that is not in contact with the surface of the building panel, thereby forming an ink matrix on the foil.

The curable ink may be a polymer material, preferably a UV curing polymer material.

The method may further comprise the step of curing the ink matrix, preferably to a hard substance.

A fourth aspect of the invention is a matrix for forming an embossed surface on a building panel produced according to the third aspect of the invention A fifth aspect of the invention is a method of forming an embossed surface on a building panel, comprising the steps of:

- providing a foil,
- forming an ink matrix having a horizontal and vertical extension by applying a curable ink on an upper part of the foil by means of a digital ink head,
- forming a cavity in a surface layer of the building panel by pressing a lower part of the foil and the ink matrix located on the upper part of the foil against the surface layer of the building panel, thereby forming an embossed surface of the building panel, and
- removing the foil with the ink matrix from the embossed surface.

The building panel may be a floor panel.

The surface layer may comprise a decorative layer with a print, preferably a digital print.

The cavity may be in register with the print.

The digital ink head may be a Piezo head.

The curable ink may be a polymer material, preferably a UV curing polymer material.

The method may further comprise curing the ink matrix, preferably to a hard substance.

The foil may be a metal or plastic foil.

The surface layer of the building panel may comprise a thermosetting resin, preferably a melamine formaldehyde resin.

A sixth aspect of the invention is a basic matrix for forming an embossing on a surface of a building panel, wherein the basic matrix is an aluminium or plastic foil or a coated paper, the basic matrix comprising:

- a lower part intended to be pressed and released from the surface of the building panel,
- an upper part that is intended to not be in contact with the surface of the building panel, and
- protrusions intended during a pressing operation to deform the basic matrix and to create cavities on the surface of the building panel.

The building panel and the production methods according to embodiments of the invention make it possible to produce very advanced decorative patterns which may be formed with a variable in register embossing that may be in register with a digitally applied décor and without repetition effects.

Embodiments and details of various aspects may be combined with embodiments and details of the other aspects.

BRIEF DESCRIPTION OF THE DRAWINGS

The invention will in the following be described in connection to preferred embodiments and in greater detail with reference to the appended exemplary drawings, wherein.

DETAILED DESCRIPTION OF EMBODIMENTS

FIG. 3*a*-3*f* shows various production steps that according to the first aspect of the invention may be used to form a variable embossed in register surface in a laminate floor or any other floor where the surface is formed by pressing and preferably also by increased temperature. The method is based on a main principle where a variable embossing is formed by digitally applied curable ink or substance, also referred to as a mat ink, that after application and curing forms an matrix that is pressed against a substrate, hereafter referred to as an ink matrix.

Figure 1A:
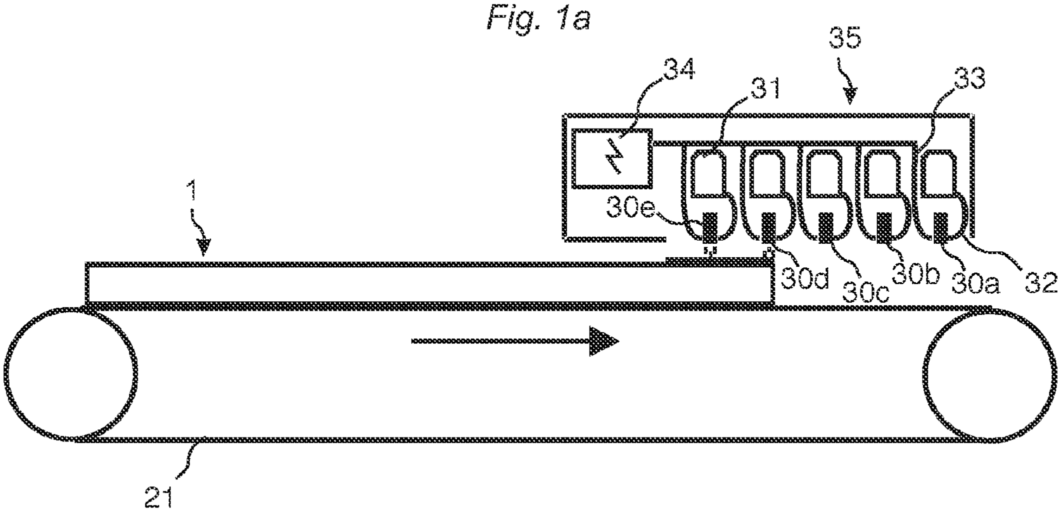
FIGS. 1*a-d* illustrate known methods to produce a printed and embossed surface.
Figure 1B:
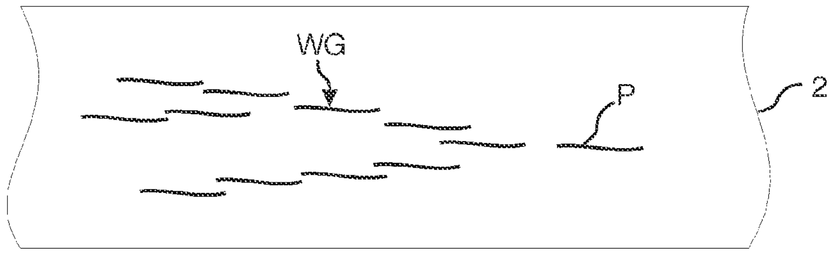
Figure 1C:
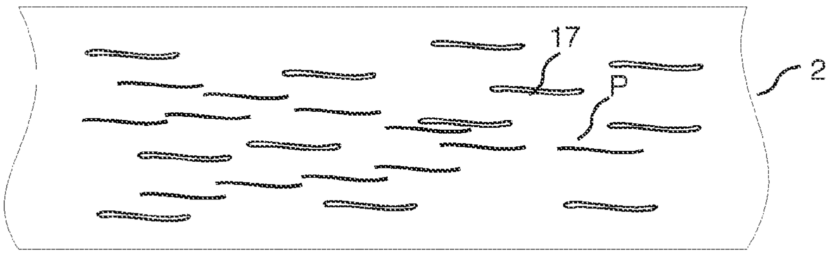
Figure 1D:
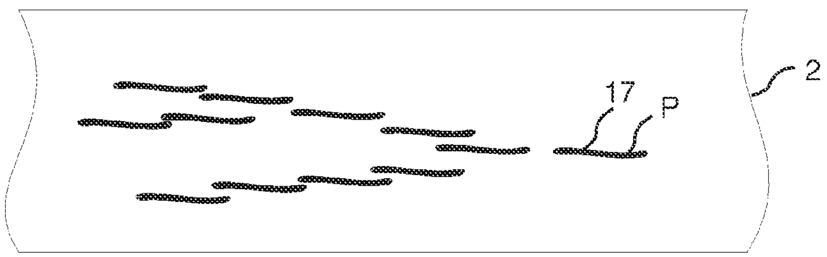
Figure 2A:
FIGS. 2*a-e* illustrate repetition effects in embossed surfaces according to known technology.
Figure 2B:
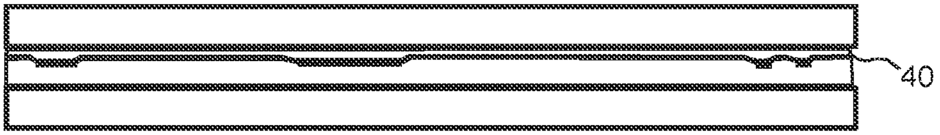
Figure 2C:
Figure 2D:
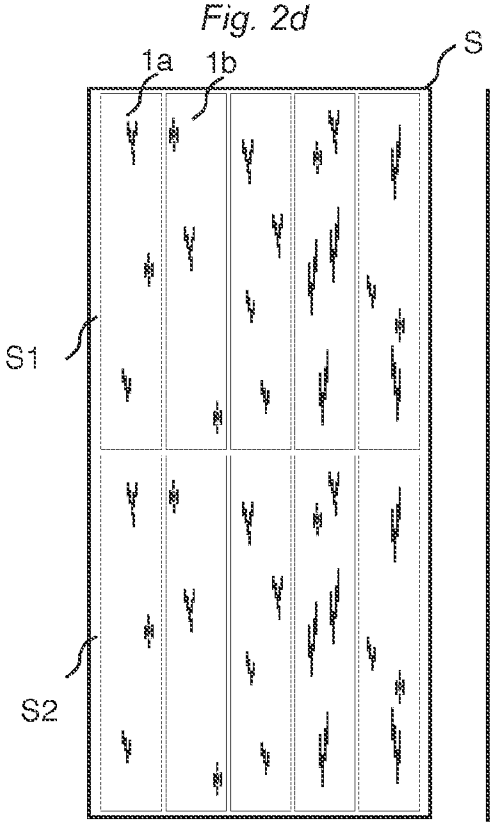
Figure 2E:
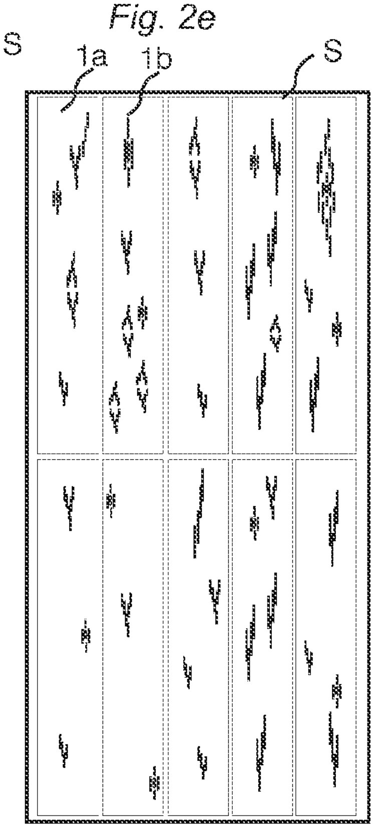
Figure 3A:
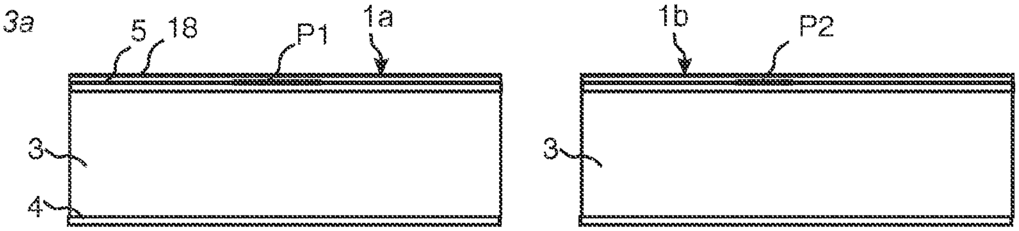
FIGS. 3*a-f* illustrate variable embossed in register according one embodiment of the invention.

FIG. 3*a* shows laminate panels 1*a*, 1*b* comprising a transparent overlay 18 and a decorative paper 5 having a décor that are applied on a HDF core 3. The laminate panels 1*a*, 1*b* comprise a backing layer 4 to balance the panel. A print P1, that may be a part of a wood grain structure, is printed by a digital printer on a first panel 1*a* and a different print P2 is printed digitally on the second panel 1*b*.

Figure 3B:
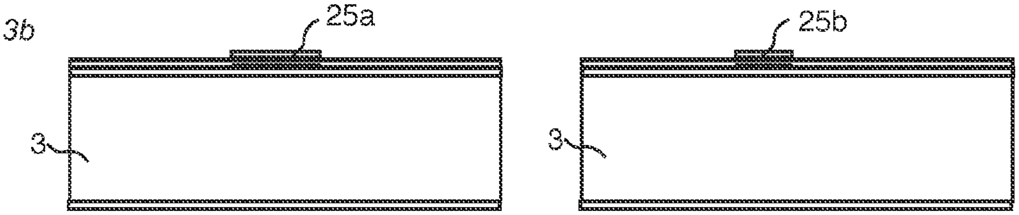
Figure 3C:
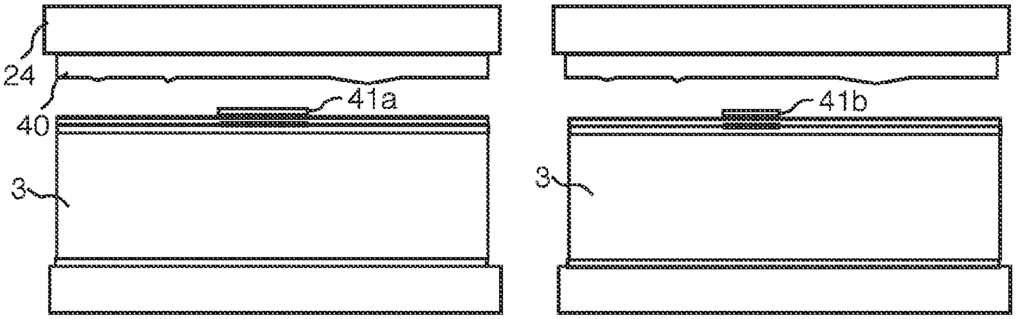
Figure 3D:
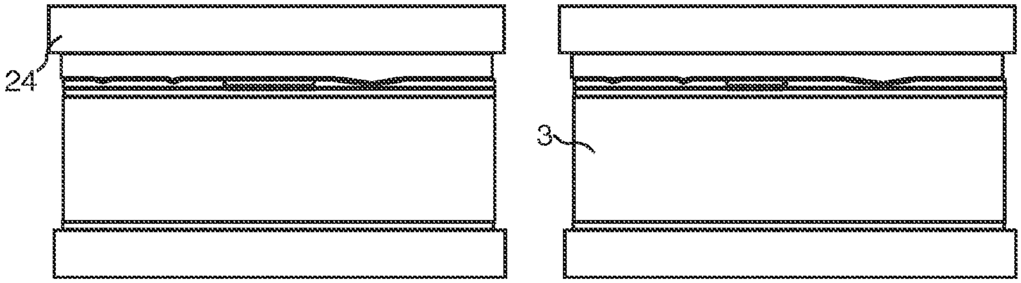
Figure 3E:
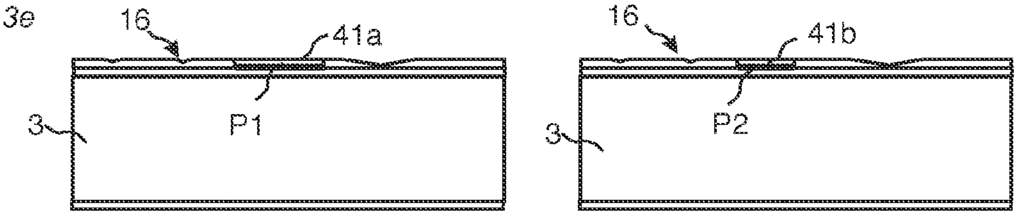
Figure 3F:
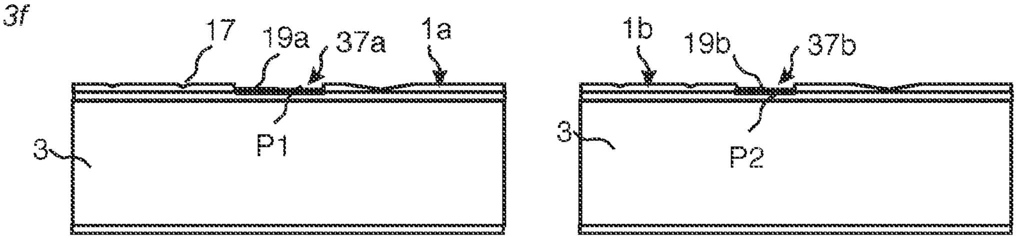

FIG. 3*f* shows the panels 1*a* and 1*b* after pressing. A part of the surface structure of the two panels, i.e. panel 1*a* and 1*b*, is in this embodiment of the invention produced with the same basic matrix 40 (FIG. 3*c*) that forms a basic embossing 17. This basic embossing is combined with a variable embossing 19*a*, 19*b* formed during pressing by an ink matrix 41*a*, 41*b*. The ink matrix is formed by a digitally applied curable ink 25*a*, 25*b*, also called a mat ink, that prior to the pressing step is cured to a hard substance.

FIG. 3*b* shows that two different curable ink patterns 25*a*, 25*b* are applied in register on the two different prints P1, P2. The curable ink 25*a*, 25*b* protrudes vertically upwards from the panel surface. The vertical extension of the curable ink may be in the range of 0.05 to 0.5 mm, for example, about 0.1 mm which corresponds to a normal embossing depth of a wood grain structure.

FIG. 3*c* shows the curable ink 25*a*, 25*b* when it is cured to a hard ink matrix 41*a*, 41*b* The panels are thereafter moved into a press with a press table 24.

FIG. 3*d* shows that the panels and the ink matrix 41*a*, 41*b* is pressed and heated such that the press matrix 41*a*, 41*b* is pressed into the panel surface and the panel surface is cured preferably under high heat and pressure similar to the pressing parameters used in laminate and powder based floors or LVT floors. The method may also be used to form structures in wood and ceramic material.

FIG. 3*e* shows that when the panels leave the press they comprise an ink matrix 41*a*, 41*b* above the print P1, P2.

FIG. 3*f* shows that the ink matrix is thereafter removed and cavities 37*a*, 37*b* are formed above the prints P1, P2. The cavities 37*a*, 37*b* form a part of a variable embossing 19*a*, 19*b*. The panels have an embossed surface comprising a basic embossing 17 and a variable embossing 19*a*, 19*b*. The variable embossing is in register with the variable digital prints P1, P2.

Many polymers may be used to produce a curable ink 25 that may form an ink matrix 41. UV curing polymers are preferred. They include a wide range of polymer materials such as acrylics, acrylates, epoxies, polyurethanes, polyesters and silicones. These materials may be applied as ink with a piezo print head. They may be designed such that they do not bond to a thermosetting or thermoplastic surface, such as melamine formaldehyde resin and vinyl, and they have sufficient strength and heat resistance which is needed to form a structured surface in the production steps that are generally used to produces the above mentioned floor types. Release agents may be included in the curable ink, in the surface or as a separate printing application prior to the curable ink coating.

High quality and superior properties may be obtained by water-based UV curing chemistry, which is a preferred embodiment due to environmental reasons.

A wide variety of curable inks may be produced to meet the specific requirements of different surface materials by, for example combining aliphatic- or aromatic, acrylic terminated, polyurethane technology with polyester and/or acrylic materials. Water based UV curing dispersions can be formulated into transparent and/or pigmented low and high gloss curable inks and coatings.

Figure 4A:
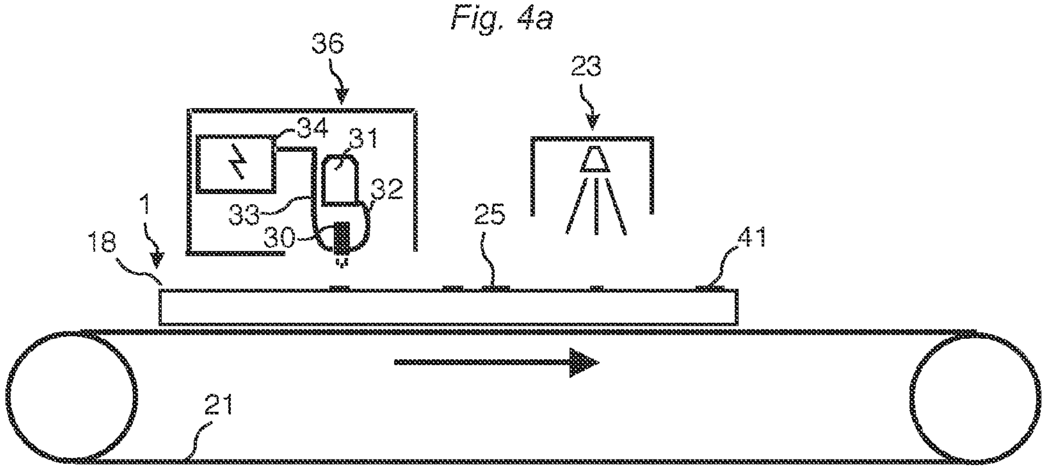
FIGS. 4*a-c* illustrate embodiments of the invention.

The main principles of a digital curable ink coating method and equipment are shown in FIG. 4*a*. A digital curable ink coating unit 36, comprising a fixed digital printing head 30, applies a preferably transparent curable ink on the overlay paper 18. The digital application is made without any contact with the overlay and the curable ink 25 is applied as drops, which are fired from the digital print head 30 towards the surface.

A UV curing oven 23 with ultra violet light is located preferably after the digital coating unit 36 in the feeding direction and may provide a practically instant curing within a few seconds of the curable ink 25 into an ink matrix 41, especially if, for example a UV cured polyurethane coating with an appropriate photo polymerization initiator is used. The digital coating head 30, which preferably is a piezo head, has preferably a capacity to fire drops with a drop size of about 50-200 picoliters or more. Several rows of print heads may be used. The drops are preferably positioned such that they overlap or join with each other.

The UV curable ink is preferably a water based UV curable polyurethane substance with a viscosity that is adapted to the digital coating head 30. Water-based polyurethane dispersions are preferred as curable ink used in the digital coating head. They are environmental friendly and technically superior to similar solvent-based coatings. They are, for example free of isocyanate and have a zero or a very low volatile organic content. They have superior properties related to hardness, stain and abrasion resistance, impact strength and temperature.

Polyurethane dispersions are fully reacted polyurethane/polyureas of small and discrete polymer particles and such particles may be produced with a size of about 0.01-5.0 microns and may therefore be handled in a digital Piezo print head or other similar heads. They may have 20-70% solid content and a wide range of layers with different hardness may be produced with a digital coating method. Polyurethane dispersions may be blended with, for example acrylic emulsions and other emulsions in order to reduce costs.

The curable ink is stored in liquid form in a coating container 31, which is connected to the digital ink head 30 with a coat-feeding pipe 32. A digital control unit connected to the ink head and the conveyor with data cables 33 controls the drop size and the speed of a conveyor 21 that displaces the panel 1 in relation to the digital ink head 30. The curable ink application equipment 36 is preferably connected to a digital printer in order to coordinate the curable ink pattern with the desired décor made by the digital printer.

Such a digital coating unit 36 is much more cost efficient than a digital printer since much larger drops may be fired and this gives an increased capacity and less problems with the channels in the head that may be sealed by larger particle in the ink when the printer works with high resolution and small drops. Each ink head may be designed to apply one layer only and there is no need to coordinate different print heads as in conventional digital printing.

The coating line may be very compact and the UV curing oven may be located close to the digital coating unit. The coating may be very precise. Surfaces comprising paper, powder, vinyl, a thermoplastic film and similar may be digitally coated in order form an advanced ink matrix 41. A powder layer is preferably stabilized with IR lamps, hot air or pre-pressing prior to the application of the curable ink and this allows that the curable ink may be applied on a rather hard but still uncured powder surface. The powder may comprise wood fibres or particles, a binder, preferably a thermosetting binder, and preferably also wear resistant particles.

Digital coating equipment may of course have several ink heads and a panel may be displaced under the ink heads several times. The digital coating may be applied on individual panels or on a large sheet that after the coating is divided into several panels.

The ink matrix particles 41 may be removed in many ways, for example by vacuum, air pressure, brushes, increased temperature, chemically, with water, etc. Curable ink may be used that after the initial pressing and heating changes its structure into smaller particles.

Very small amounts may be used to provide an advanced DVEIR surface. Only 5-10% of the surface may be covered to an average depth of 0.05 to 0.5 mm, for example, 0.1 mm and this means that only 5-10 g/m2 may be needed. The removed ink matrix material may be recycled and used as filler in other applications.

The method may be used to form deep embossing with a depth of about 0.5 mm and more especially if several layers of curable ink are applied.

Figure 4B:
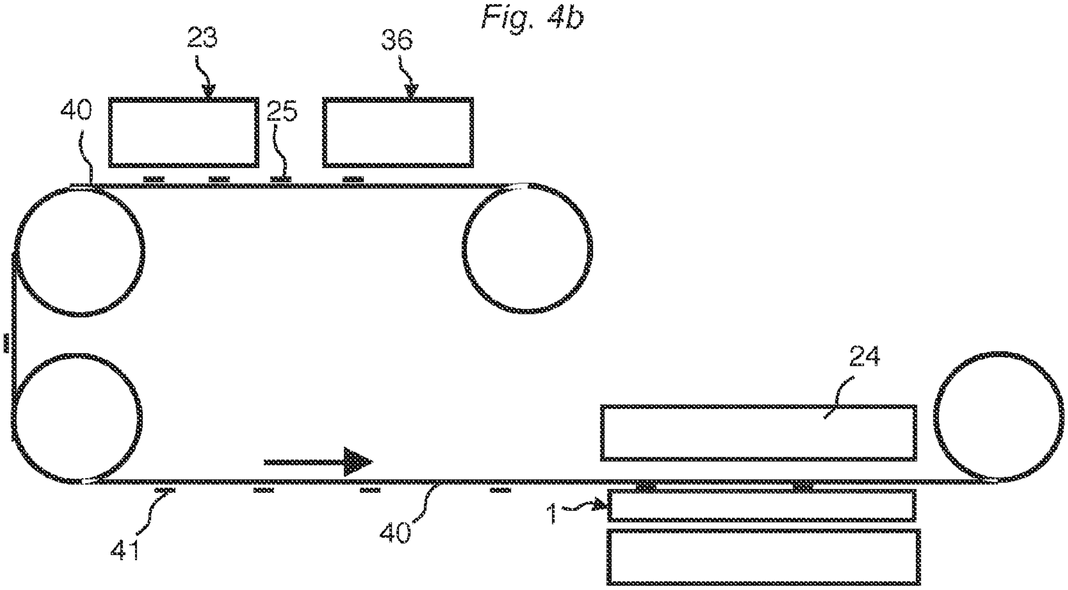
Figure 4C:
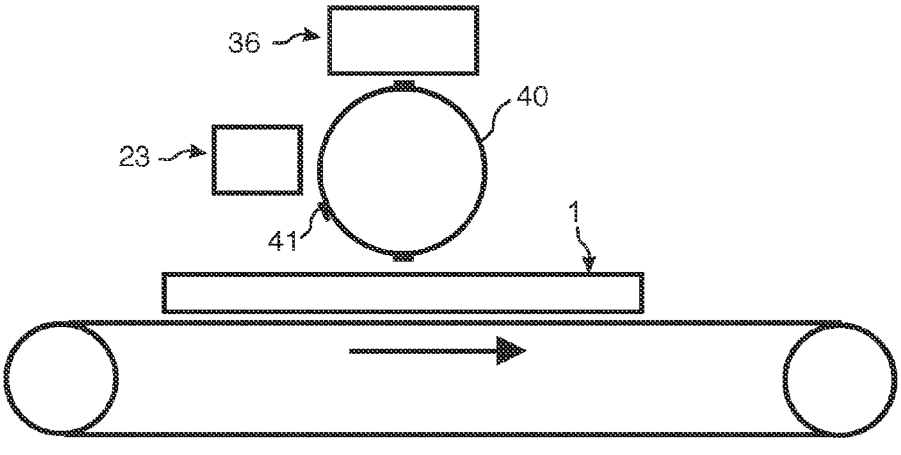

FIG. 4*b* shows curable ink coating on a substrate such as a structured release paper or film 40 where the curable ink 25 is applied on the substrate 40 and not on the panel surface. This transfer method is preferred when a basic embossing is created by a foil and not by a press plate. The pressure may be applied by a press table 24 as shown or a press cylinder (not shown). FIG. 4*c* shows that the curable ink may be applied on a pressing cylinder or roller 40. The curable ink 25 may be fixedly connected to the substrate or just transferred to the surface by the substrate where it in a following step is removed from the surface.

FIGS. 5*a*-5*d* show a DVEIR method that may be uses to provide embossed structures in practically all type of flooring materials in a very simple and cost efficient way.

Figure 5A:
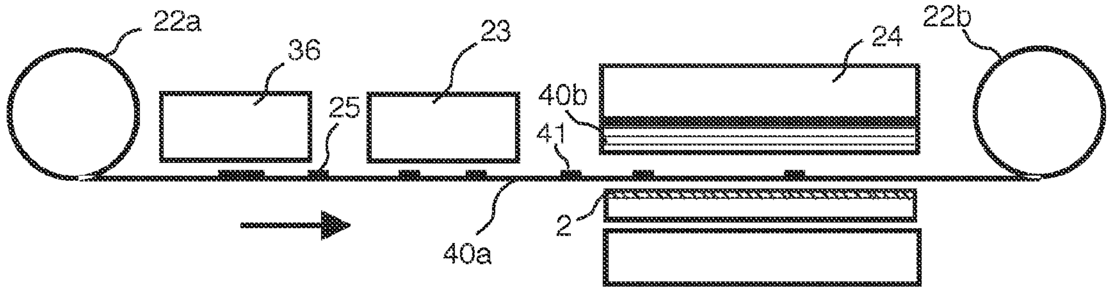
FIGS. 5*a-d* illustrate embodiments of the invention.
Figure 5B:
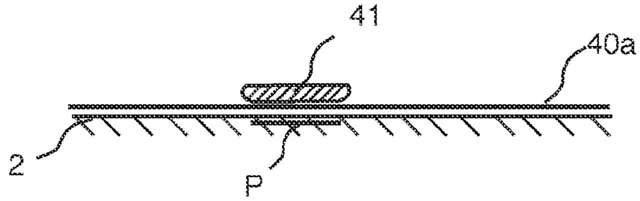
Figure 5C:
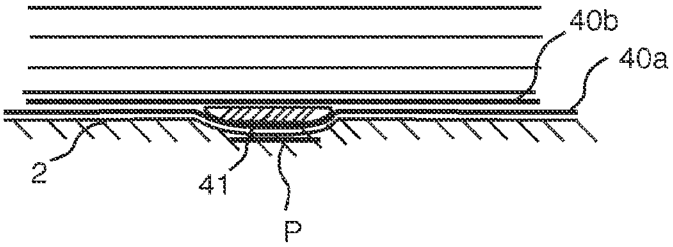
Figure 5D:
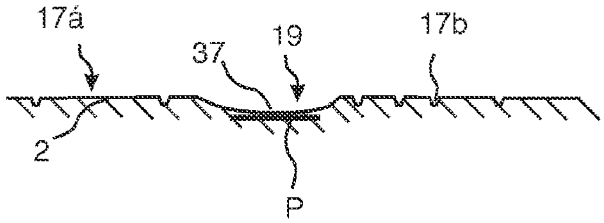

FIGS. 5*a, b* show that a substrate such as a first basic matrix material 40*a*, that preferably forms a part of the basic microstructure. The first basic matrix material 40*a* is preferably transported through a press 24 from one in feeding roller 22*a* to an out feeding roller 22*b*. The first basic matrix material 40*a* may be an aluminium or plastic foil, or coated and embossed release paper and similar. Such matrix materials are generally used in the flooring industry and may provide a variety of microstructures with different gloss levels. A second basic matrix 40*b* may also be used and may be a conventional press plate. A curable ink 25 is applied on the rear side of the first basic matrix 40*a* by a digital coating unit 36 and may be cured by a UV curing oven 23 to an ink matrix 41. FIG. 5*c* shows that the second basic matrix 40*b* on the press table 24 presses against the first basic matrix 40*a* and against the ink matrix 41 on the first matrix 40*a*. FIG. 5*d* shows the surface structure when the first basic matrix 40*a* with the ink matrix 41 is removed. A variable embossing 19 is formed as a cavity 37 by the ink matrix 41 in the surface 2 and in register with the print P. The surface comprises also a basic microstructure 17*a* and a basic embossed structure 17*b* formed by the first and/or the second basic matrix 40*a*, 40*b*.

This method may be used to form a basic matrix 40*a* that may be supplied in roles or sheets and used for forming an embossed surface on a building panel. The basic matrix 40*a* may be an aluminium or plastic foil or a coated paper as described above. The basic matrix comprises a lower part intended to be pressed and released from a the panel surface and an upper part that is not in contact with the panel surface during pressing and that comprises protrusions 41 that during a pressing operation deforms the basic matrix 40*a* and created protrusions on the lower parts of the matrix that forms cavities 37 in the panel surface as shown in FIGS. 5*b* and 5*c*.

The press and the press plate may be replaced by a hot and preferably pre structured roller. Advanced DVEIR structures may be formed in thermoplastic materials such as floors with a vinyl surface layer.

All the above-described methods may be partly or completely combined.

Embodiments of the invention may also be used to produce conventional pre-embossed release materials such as coated paper or foils that are supplied in rolls or sheets to a flooring factory in order to form an pressing matrix such as a matrix material. A digital ink matrix may be formed on the upper and/or the lower side of the pre embossed materials. Even material of metal may be formed by etching where a digital ink head applies an ink that may be used to etch and form embossed surfaces.

A person skilled in the art appreciates that the embossed structure may be formed only from the ink matrix and that no embossed press plate or first or second basic matrix forming a basic embossed structure has to be used. The ink matrix arranged on a substrate may be used to replace a conventional embossed press plate.

The main principles of embodiments of the invention may also be used to form an embossed surface structure by applying small hard particles on a surface prior to the pressing step and removing the particles after pressing. The particles may be positioned digitally. A binder pattern or image may be formed digitally on a substrate, by an ink head that only applies a binder that may comprise water. The substrate may be a powder layer, an overlay paper, or a thermoplastic foil or similar. The liquid binder may connect the particles directly or indirectly by reacting with a binder such as, for example melamine formaldehyde resin that may be included in the surface or in the hard particles. The small hard particles are scattered randomly by a scattering device over the binder pattern. The binder connects some particles that form the same pattern as the liquid binder while other non-bonded particles are removed by, for example airstreams. The remaining particles form a protruding structure similar to the cured curable ink. The substrate is thereafter pressed and cured and the hard particles are pressed into the surface. The hard particles are thereafter removed, for example mechanically, by heat, air streams, or chemically. The hard particles may be sand, aluminium oxide or other minerals. Even salt or sugar may be used and a final removal may be accomplished by melting the particles with water. The binder may be applied digitally prior or after the scattering of the hard particles.

Example:

A digital image was applied in a powder based surface layer of a panel comprising a HDF board material as a core. The powder was a mix of wood fibres (40%), aluminium particles (10%) and melamine formaldehyde resin powder (50%). The image was created and injected into the powder with a single pass printer comprising 5 fixed Piezo print heads. The ink was a water-based ink comprising colour pigments. A piezo print head with a drop size of 30 picoliters was used to apply a matrix pattern with curable ink comprising a water based UV cured polyurethane (PU) on a rear side of an aluminium foil. The PU matrix pattern was the same as the wood grain structure of the digital image. The PU matrix pattern was cured in a UV oven to an ink matrix. The aluminium foil was positioned above the digital print such that the ink matrix and the digital image were in register with each other. The panel and the aluminium foil with the ink matrix were pressed in a press with a pressure of 40 kg/cm2, during 30 seconds and heated to 160 degrees Celsius. The aluminium matrix was removed after pressing. A perfect embossed in register surface design was obtained with a basic gloss level that corresponded to the surface structure of the aluminium foil.

Embodiments:

1. A method of forming an embossed surface (16) in a building panel (1), comprising the steps of:
   forming an ink matrix (41, 41*a*, 41*b*) having a horizontal and vertical extension by applying a curable ink (25, 25*a*, 25*b*) on a surface layer (2) of the building panel (1) by means of a digital ink head (30),
   forming a cavity (37) in the surface layer (2) by pressing the ink matrix (41, 41*a*, 41*b*) against the surface layer (2), thereby forming an embossed surface (16) of the building panel (1), and
   removing the ink matrix (41, 41*a*, 41*b*) from the embossed surface (16).
2. The method as in embodiment 1, wherein the building panel (1) is a floor panel.
3. The method as in embodiment 1 or 2, wherein the surface layer (2) comprises a decorative layer (5) with a print (P), preferably a digital print (P).
4. The method as in claimed in embodiment 3, wherein the cavity (37) is in register with the print (P).
5. The method as in any one of the preceding embodiments, wherein the digital ink head (30) is a Piezo head.
6. The method as in any one of the preceding embodiments, wherein the curable ink (25) is a polymer material, preferably a UV curing polymer material.
7. The method as in any one of the preceding embodiments, further comprising curing the curable ink to form the ink matrix (41).

8. A set of building panels (1) having a surface layer (2) comprising a décor layer (5) and an embossed upper layer (16), characterized in that the décor layer (5) comprises a variable print (P), the embossed upper layer (16) comprises a basic embossing (17) being essentially identical for the set of building panels (1) and a variable embossing (19) being distinguishable for each building panel, wherein the variable embossing (19) is in register with the variable print (P).
9. The building panels as in embodiment 8, wherein the building panels (1) are floor panels.
10. The building panels as in embodiment 8 or 9, wherein the variable print (P) is a digital print.
11. The building panels as in any one of embodiments 8-10, wherein the basic embossing (17) is formed in register with a basic design of the décor layer (5).
12. The building panels as in embodiment 11, wherein the basic design of the décor layer (5) is a print (P), preferably a digital print.
13. The building panel as in any one of embodiments 8-12, wherein the building panels are configured with an embossed surface that allows a floor area of more than about 10 m2, preferably more than about 15 m2, to be installed where all building panels have different surface structures.
14. A method of forming a matrix for forming an embossed surface (16) on a building panel (1), comprising the steps:
    providing a matrix comprising a foil (40) with a lower part comprising a release surface that during pressing is in contact with a surface of the building panel (1) and that prevents the matrix from bonding to the surface of a building panel, preferably a thermosetting or thermoplastic surface of a building panel, and
    applying a curable ink (25) by means of a digital ink head (30) on an upper part of the foil (40) that is not in contact with the surface of the building panel (1), thereby forming an ink matrix (41) on the foil (40).
15. A matrix for forming an embossed surface (16) on a building panel produced according to embodiment 14.
16. A method of forming an embossed surface (16) on a building panel (1), comprising the steps of:
    providing a foil (40),
    forming an ink matrix (41) having a horizontal and vertical extension by applying a curable ink (25) on an upper part of the foil (40) by means of a digital ink head (30);
    forming a cavity (37) in a surface layer (2) of the building panel (1) by pressing a lower part of the foil and the ink matrix (41) located on the upper part of the foil against the surface layer (2) of the building panel (1), thereby forming an embossed surface (16) of the building panel (1), and
    removing the foil with the ink matrix (41) from the embossed surface (16).
17. The method as in embodiment 16, wherein the building panel (1) is a floor panel.
18. The method as in embodiment 16 or 17, wherein the surface layer (2) comprises a decorative layer (5) with a print (P), preferably a digital print (P).
19. The method as in embodiment 18, wherein the cavity (37) is in register with the print (P).
20. The method as in any one of embodiments 16-19, wherein the foil (40) is a metal, such as aluminium, or plastic foil.
21. The method as in any one of embodiments 16-20, wherein the surface layer (2) of the building panel (1) comprises a thermosetting resin, preferably a melamine formaldehyde resin.
22. A basic matrix (40*a*) for forming an embossing on a surface (2) of a building panel (1), wherein the basic matrix is an aluminium or plastic foil or a coated paper, the basic matrix comprising:
    a lower part intended to be pressed and released from the surface (2) of the building panel (1),
    an upper part that is intended to not be in contact with the surface (2) of the building panel (1), and
    protrusions (41) intended during a pressing operation to deform the basic matrix (40*a*) and to create cavities (37) on the surface (2) of the building panel (1).

The invention claimed is:

1. A set of building panels comprising a surface layer and a core layer, the surface layer comprising a decorative layer and an embossed layer, wherein, at any given location, the decorative layer is between the core layer and the embossed layer, wherein
the decorative layer comprises a variable print,
the embossed layer comprises a basic embossing being essentially identical for the set of building panels and a variable embossing being distinguishable for each building panel, wherein the variable embossing is in register with the variable print, and
in each panel of the set, at essentially any given location, the basic embossing does not have a point in register.

2. The building panels as claimed in claim 1, wherein the building panels are floor panels.

3. The building panels as claimed in claim 1, wherein the variable print is a digital print.

4. The building panels as claimed in claim 1, wherein the basic embossing is formed in register with a basic design of the decorative layer.

5. The building panels as claimed in claim 4, wherein the basic design of the decorative layer is a print.

6. The building panels as claimed in claim 1, wherein the building panels are configured with an embossed surface that allows a floor area of more than about 10 $m^2$ to be installed where all building panels have different surface structures.

7. The building panels as claimed in claim 1, wherein the variable embossing is in alignment with the variable print.

8. The building panels as claimed in claim 1, wherein the variable embossing is a cavity that is exposed on the front side of the building panels.

9. The building panels as claimed in claim 1, wherein the embossed layer is a wear layer.

10. The building panels as claimed in claim 1, wherein the embossed layer is transparent.

11. The building panels as claimed in claim 1, wherein the building panels each includes a wear layer which comprises aluminium oxide particles.

12. The building panels as claimed in claim 1, wherein the decorative layer is a decorative paper sheet.

* * * * *